United States Patent [19]
Larson

[11] Patent Number: 5,372,371
[45] Date of Patent: Dec. 13, 1994

[54] APPARATUS AND METHODOLOGY FOR TEMPORARILY CONVERTING SINGLE BICYCLES INTO A BICYCLE BUILT FOR TWO

[76] Inventor: Scott M. Larson, 1975 Brandon Cir., Anaheim, Calif. 92807

[21] Appl. No.: 67,495

[22] Filed: May 26, 1993

[51] Int. Cl.⁵ .............................................. B62K 13/02
[52] U.S. Cl. .................. 280/7.16; 280/239; 280/273
[58] Field of Search .............. 280/7.1, 7.16, 282, 280/292, 295, 239, 273

[56] References Cited

U.S. PATENT DOCUMENTS

| | | | |
|---|---|---|---|
| 579,982 | 4/1897 | Jakobson | 280/7.16 |
| 598,872 | 2/1898 | Hunt | 280/7.16 |
| 658,406 | 9/1900 | Straub | 280/273 |
| 1,300,343 | 4/1919 | Carswell | 280/7.13 |
| 4,458,908 | 7/1984 | Strong | 280/292 X |
| 5,171,034 | 12/1992 | Scott | 280/292 X |

FOREIGN PATENT DOCUMENTS 3729879 3/1989 Germany .............. 280/239

*Primary Examiner*—Mitchell J. Hill
*Assistant Examiner*—Carla Mattix
*Attorney, Agent, or Firm*—Daniel L. Dawes

[57] ABSTRACT

An improved apparatus and method for converting two single rider bicycles into a tandem tricycle is provided through means of extending the rear axle of the front bicycle of the tandem by rear axle extenders. The rear axle extenders are in line with the rear axle and provide a bearing upon which a modified front fork of the rear bicycle is mounted. The bearing is positioned outboard on the rear axle extenders by a distance sufficient to allow the modified front fork of the rear bicycle to clear all gearing or transmissions provided on the rear axle of the front bicycle. The modified front fork of the rear bicycle is modified to provide a distance of separation between the tines of the fork to allow for this clearance. Front axle extenders are also provided to the front axle of the front wheel of the rear bicycle when the two bicycles are disassembled to allow them to be used once again as single rider bicycles. The front axle extenders are coupled to the modified front fork in a manner similar to the coupling between the rear axle extenders except that no bearing or rotational motion between the front axle extenders and modified fork is required.

10 Claims, 2 Drawing Sheets

APPARATUS AND METHODOLOGY FOR TEMPORARILY CONVERTING SINGLE BICYCLES INTO A BICYCLE BUILT FOR TWO

BACKGROUND OF THE INVENTION

1. Field of the Invention

The invention relates to the field of bicycle accessories and in particular to parts for bicycles which can be used to temporarily convert two bicycles designed for single riders to a tandem tricycle built for two riders.

2. Description of the Prior Art

The connection of two single bicycles to form a bicycle built for two or what is sometimes called a tandem tricycle is well known. One typical example shown by Strong, "Tandem Tricycle," U.S. Pat. No. 4,458,908 (1984), which shows two standard bicycles connected by removing the front wheel and fork of the rear bicycle and placing an adapter on the frame of the rear bicycle. The adapter on the rear bicycle is then mounted to the rear axle of the leading bicycle. As shown in Strong, fork 68 includes two tines 70 which extend downwardly from pivot shaft 64 opposite the sides of common wheel 34. Each tine 70 is coupled to a suitable adapter 72. The adapter 72 allows lengthening of tine 70 to accommodate varying tire diameters. Tine adapter 72 may be disconnected from axle adapters 80 and axle adapters 80 are left on axle 62 of the common wheel 34 when the rear bicycle is disconnected from the tandem.

However, in order to accommodate the spread of the gear mechanism and derailer in the rear bicycle, adapter bar 72 must be mounted on the outside of tines 70 of the fork and then connected to some type of adapter 80 to the rear axle 62 of the front bicycle. This, in many cases, results in obstruction of the free motion of the adapter thereby preventing adaptation of many bicycles using derailer transmissions. Furthermore, adapters 72 and 80 are fabricated from flat plate steel and are subject to substantial stress in the tandem tricycle. Such flat plates are relatively fragile and are subject to bending or breakage. The arrangement of Strong also fails to sufficient structural rigidity.

Carswell, "Bicycle Coupling," U.S. Pat. No. 1,300,343 (1919) shows another arrangement whereby a tandem tricycle is temporarily assembled. The tines C of the fork of the rear bicycle are coupled to a coupling link 10 which is a complex forged piece having a ball bearing hub 16 into which the fork connects. Hub 16 then extends integrally downward in an arm 24 to connect to the rear axle of the front bicycle.

Again, this design is such that coupling link 10 interferes with the action of the derailer transmission of the front bicycles, and it also requires the manufacture of a costly molded link including a ball bearing hub in order to provide a strong, but swivelled connection between the two bicycles.

Hunt, "Tandem," U.S. Pat. No. 598,872 (1898) describes another tandem system in which the fork 8 of the rear bicycle is coupled directly to the axle hub of the front bicycle and is further coupled together through handlebar cables 21 and a frame connector depicted in FIGS. 1 and 3. Hunt fails to provide the rigidity of connection between the two bicycles while still allowing a degree of rotation between them through means which are easy to install and economically manufactured.

Jakobson, "Tandem Attachment for Bicycles," U.S. Pat. No. 579,982 (1897) shows another example of a tandem tricycle utilizing a frame-to-frame connection as well as a axle-to-frame in fork connection utilizing a complex linkage of rest-plates D in a lower fork C. Jakobson is difficult to assemble, manufacture and fails to provide sufficient ruggedness between the bicycles which allows for the ease of their assembly and disassembly into a tandem unit and then back into single units.

Jakobson, "Tandem Attachment for Bicycles," U.S. Pat. No. 552,907 (1896) shows another example similar to Jakobson '982 wherein two frame attachments are utilized to couple a front and rear bicycle without a fork attachment between the rear bicycle and the rear axle of the bicycle. Again, Jakobson '907 is subject to complexity, is not easily converted between tandem and single modes, and fails to provide sufficient rigidity of connection while allowing rotation between the bicycles.

What is needed is some type of connection which is inexpensive to manufacture, extremely strong and rugged, does not interfere with the action of derailers commonly used on bicycles, can easily be converted into tandem and also back to single rider configurations by the user without the need for special skills or tools, and yet provides sufficient strength and rigidity between the two bicycles to withstand abuse and provide a solid connection between the two bicycles.

BRIEF SUMMARY OF THE INVENTION

The invention is an apparatus for converting at least two single rider bicycles into a tandem tricycle. One of the bicycles is a front part of the tandem tricycle and the other one of the bicycles is a rear part of the tandem tricycle. The apparatus comprises a front bicycle fork of the rear bicycle having an expanded tine separation. A pair of rear extenders are coupled to the front bicycle. The front bicycle has a rear axle with two ends. One of the rear extenders extend each end of the rear axle. The rear extenders are rotatably coupled to the front fork to provide rigid coupling with the front fork while permitting rotation of the front and rear bicycles with respect to each other about the rear axle. As a result, the tandem tricycle can be temporarily assembled and disassembled through a low cost conversion and with the use of simple tools.

The rear extenders each have a longitudinal axis and the rear axle has a corresponding longitudinal axis. The longitudinal axes of the rear extenders are arranged and configured to lie parallel with the longitudinal axis of the rear axle when the rear extenders are coupled to the rear axle. In the preferred embodiment the parallel longitudinal axes of the rear extenders and the rear axle are colinear.

In one embodiment each rear extender comprises a body having a bore defined therein for receiving the rear axle. An element is provided for coupling the body to the rear axle. A bearing couples the body to the front fork and permits rotation of the front fork about the longitudinal axes of the rear extender.

The bore in the body is threaded and the rear axle is threadedly coupled to the threaded bore of the body. The body further comprises a nut portion to permit the body to be threaded onto the rear axle and tightened thereon.

The front fork has a terminal portion for coupling to the rear extender. The terminal portion captures the rear extender while permitting rotational motion of the front fork relative to the rear extender. The rear extender comprises a bearing for coupling to the terminal portion. The bearing permits rotational movement of the fork relative to the rear extender while the combination of the bearing and terminal portion prevent substantial rotation around any other axis. In the illustrated embodiment the terminal portion comprises a C-clamp combination for capturing the rear extenders.

In another embodiment the element for coupling to the rear axle comprises a quick release means for clamping the body to the rear axle.

The front and rear bicycle are adapted to be disassembled from the tandem tricycle. The disassembled rear bicycle is provided with a front wheel and a front axle. The apparatus further comprises a pair of front extenders coupled to the front axle. The front extenders are rigidly coupled the front fork of the rear bicycle. The front axle and front extenders each have a longitudinal axis. The axes of the front axle and front extenders are colinear with each other.

In one embodiment each front extender comprises a body having a bore defined therein for receiving the rear axle. An element is provided for coupling the body to the rear axle. A fitting is provided for coupling the body to the front fork. The element for coupling to the front axle comprises a quick release means for clamping the body to the front axle.

The invention is also a method for converting two single rider bicycles into a tandem tricycle including a front bicycle and a rear bicycle. The rear bicycle has a rear axle. The rear axle has a longitudinal axis. The method comprises the steps of: removing a front wheel of the rear bicycle; removing a front fork of the rear bicycle; and installing a modified front fork on the rear bicycle. The modified front fork has an expanded separation between tines of the front fork. Rear extenders are installed on the rear axle of the front bicycle. The rear extenders have a longitudinal axis colinear with the longitudinal axis of the rear axle. The modified front fork is coupled to bearings provided on the rear extenders. The bearings permit rotational movement of the modified front fork with respect to the rear axles along an axis colinear with the axis of the rear axle. As a result, the front and rear bicycle are easily and inexpensively converted through simple tools and skills into the tandem tricycle.

In one embodiment the step of installing the rear extenders on the rear axle comprises the step of threadably coupling the rear extenders to each end of the rear axle. In another embodiment the step of installing the rear extenders on the rear axle comprises the step of disposing the rear extenders on an extended quick release axle and clamping the rear extenders to the extended quick release axle by means of a quick release mechanism.

The method includes the step of disassembling the tandem tricycle to reconvert the front and rear bicycle into single rider bicycles. The step of disassembling comprises the steps of: uncoupling the modified front fork from the rear extenders; installing front extenders on a front axle of the rear bicycle; and coupling the front extenders to the modified front fork.

Finally, the invention is also characterized as a conversion kit for converting two single rider bicycles into a tandem tricycle. One of the bicycles is defined as a front bicycle having a rear axle and the other one of the bicycle is defined as a rear bicycle. The conversion kit comprises a modified front fork adapted to fit the rear bicycle. The modified front fork characterized by having an expanded tine-to-tine separation. A pair of rear axle extenders are coupled to the rear axle of the front bicycle and are rotatably coupled to the modified front fork. The rear axle extenders provide rigid coupling between the front and rear bicycles, but permit rotation of the front and rear bicycles with respect to each other about the rear axle. A pair of front axle extenders are coupled to the front axle of the rear bicycle. The front axle extenders provide for rigid coupling between the modified front fork and the front axle of the rear bicycle.

The invention and its various embodiments may be better visualized by turning to the following drawings wherein like elements are referenced by like numerals.

These and other embodiments of the invention are best understood by now turning to the following detailed description.

DETAILED DESCRIPTION OF THE PREFERRED EMBODIMENTS

An improved apparatus and method for convening two single rider bicycles into a tandem tricycle is provided through means of extending the rear axle of the front bicycle of the tandem by rear axle extenders. The rear axle extenders are in line with the rear axle and provide a bearing upon which a modified front fork of the rear bicycle is mounted. The bearing is positioned outboard on the rear axle extenders by a distance sufficient to allow the modified front fork of the rear bicycle to clear all gearing or transmissions provided on the rear axle of the front bicycle. The modified front fork of the rear bicycle is modified to provide a distance of separation between the tines of the fork to allow for this clearance. From axle extenders are also provided to the front axle of the front wheel of the rear bicycle when the two bicycles are disassembled to allow them to be used once again as single rider bicycles. The front axle extenders are coupled to the modified front fork in a manner similar to the coupling between the rear axle extenders except that no bearing or rotational motion between the front axle extenders and modified fork is required.

Figure 1:
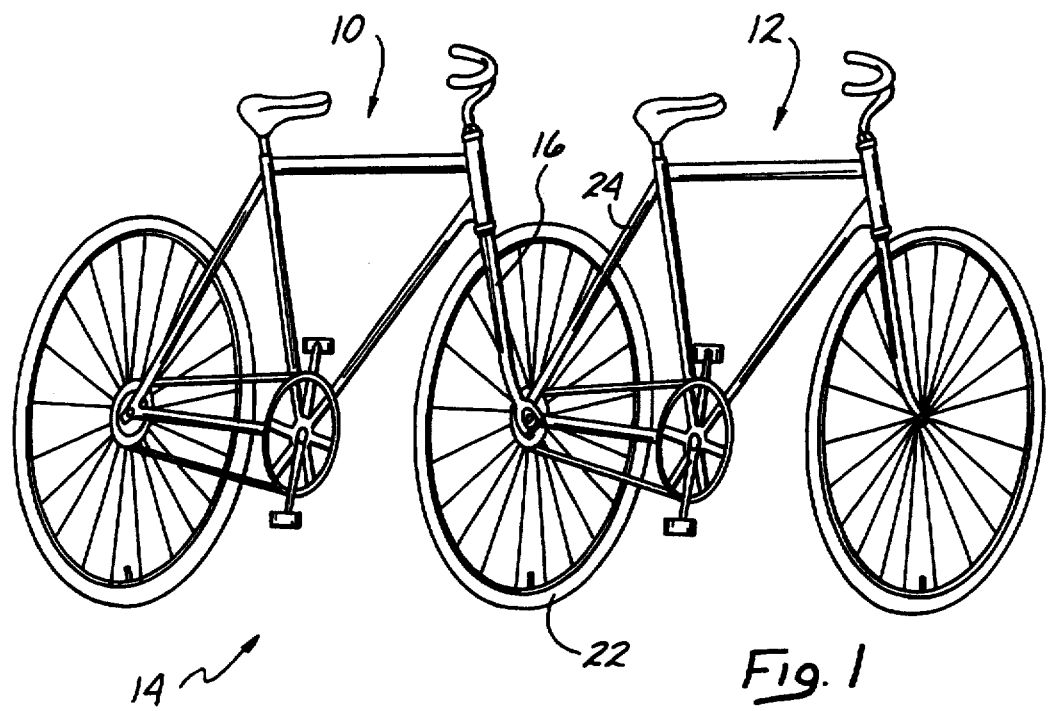
FIG. 1 is a simplified side elevational view of two bicycles which are joined together to form a tandem tricycle according to the invention.

FIG. 1 is a simplified depiction of a side elevational view of two single rider bicycles 10 and 12 which have been joined together to collectively form a tandem tricycle 14. The front bicycle 12 is a conventional bicycle which may include a multigear derailer (not shown). Front bicycle 12 is substantially unmodified except as described below. Rear bicycle 10 is also a conventional single rider bicycle from which the front wheel has been removed and a modified front fork 16 substituted. Fork 16 as best depicted in the diagrammatic depiction of FIG. 2 mounts on axle extenders 26 coupled to rear axle 20 in a manner described below in connection with FIGS. 3 and 4. The unmodified rear wheel 22 of front bicycle 12 is coupled in a conventional manner to rear axle 20 of bicycle 12, which axle forms the common axle for rear bicycle 10 when converted to tandem tricycle 14. Modified fork 16 is substantially equivalent to the conventional fork of bicycle 10 which it replaces except that tines 18 of fork 16 has been spread so that the separation between the ends of the tines of the fork is increased from approximately three inches in a conventional bicycle to between five to eight inches depending upon the make and type of front bicycle 12 and the gear transmission of the bicycle 12 which must be accommodated.

Figure 3:
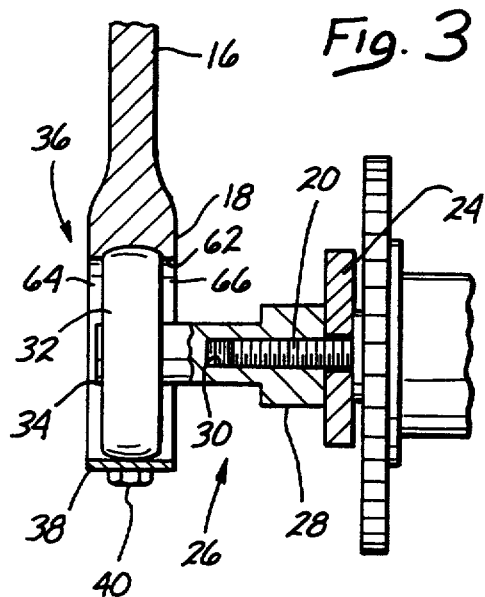
FIG. 3 is a simplified front cutaway view of a rear axle adapter shown in enlarged scale as utilized in the conversion of FIG. 1.

Turn now to FIG. 3 which shows a simplified front cross sectional view of an axle extender 26 of the invention coupled to rear axle 20 of bicycle 12. The normal mounting nut provided on bicycle 12 fixing axle 20 to rear fork 24 of bicycle 12 is removed and replaced by axle extender 26. Axle extender 26 is comprised in the embodiment of FIG. 3 of a base portion 28 having two or more flats provided on it to allow base 28 to be tightened on axle 20 through the use of an ordinary wrench or tool. In the preferred embodiment extender 26 is provided with a hexagonal base.

Adapter 26 has a bore 30 defined therein which is threaded to match the threading of rear axle 20. Thus, rear axle 20 is threaded into bore 30 of axle extender 26 and tightened against frame 24 by turning base 28 with a common tool, such as a wrench.

A captured bearing or bushing 32 is mounted on or near outer end 34 of axle extender 26 to provide a bearing surface for modified fork 16. Bearing 32 may be a fully sealed, self-lubricating bearing adapted for coupling to the end of the tines of fork 16 and to allow rotational movement of fork 16 about the common axis of adapter 26 and rear axle 20. Fork 16 may be coupled to bearing 32 by any means now known or later devised such as a slot and clamp combination or a C-clamp combination.

Figure 4:
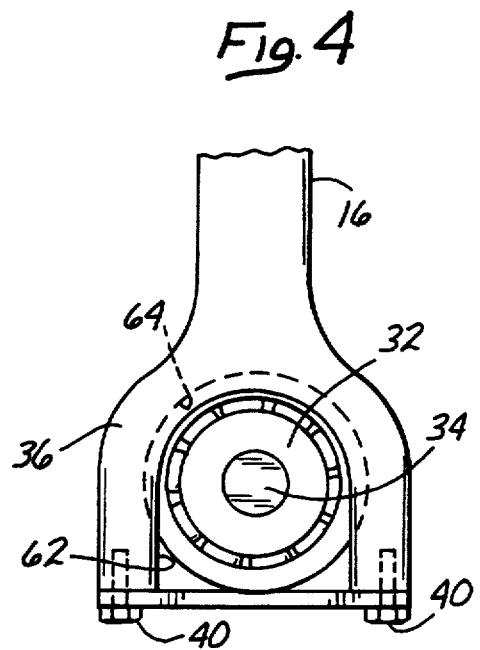
FIG. 4 is a side elevational view in enlarged scale of the terminal portion of the modified fork used in FIGS. 1-3.

In the illustrated embodiment, the lower portion of the modified fork 16 is shown in enlarged scale in a side elevational view in FIG. 4 which bearing 32 is captured within a C-shaped receiving termination 36 of fork 16 and retained in termination 36 in part by plate 38 securely bolted to termination 36 by means of bolts 40. Although a round bushing 32 has been illustrated, any shaped bushing adapted to the clamping mechanism chosen may be used. For example, bushing 32 may in fact be square to fit within a square-shaped receptacle in termination 36 if desired.

Figure 6:
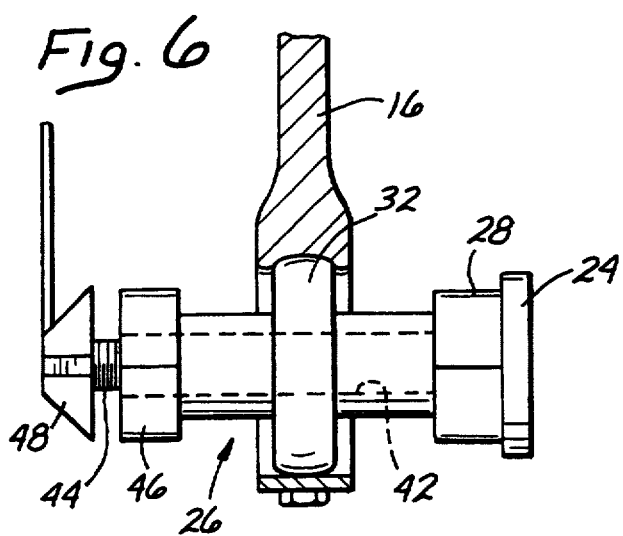
FIG. 6 is a front partially cutaway cross sectional view of a front axle mount used in a converted rear bicycle of FIG. 1 when it is decoupled from the front bicycle and again used as a single rider bicycle with front axle extenders of the invention.

A second embodiment of rear axle extender 26 is shown in FIG. 6 for use in combination with a conventional quick release mechanism for a bicycle. In the embodiment of FIG. 6, a smooth bore 38 is defined within extender 26 extending from base 28. A longer quick release axle 44 replaces conventional axle 20 and extends through bore 42. The outer end of axle 44 extends from the outer end 46 of extender 26 and is clamped to extender 26 and hence frame 24 by means of a conventional quick release nut or lever 48.

Alternatively, extended quick release axle 44 may be threaded to or otherwise coupled at its inner end to the outer end of conventional axle 20 and thence to effectively extend axle 20 through bore 42 past end 46 of extender 26 to provide a means for quick release coupling.

In either embodiment, each end of axle 20 is provided with a similar extender 26 to fit the corresponding tine of modified fork 16. Extender 26 may be left on axle 20 of bicycle 12 even after tandem tricycle 14 is disassembled. The presence of extender 26 does not in any manner interfere with the normal operation of bicycle 12 or its derailer, since it is placed outwardly from frame 24 and its corresponding derailer to provide sufficient clearance between any outward mechanism of bicycle 12 on rear wheel 22 and any portion of modified fork 16.

Figure 5:
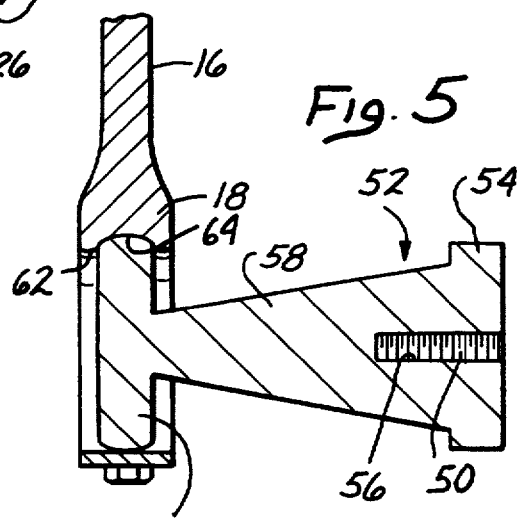
FIG. 5 is a front cutaway view of a second embodiment of quick release rear axle adapter used in the conversion of FIG. 1.

Modified fork 16 is assembled onto a rear bicycle 10 only once. Once the conventional fork has been removed and modified fork 16 put in place, bicycle 10 is thereafter left in its converted configuration with modified fork 16. Since the front axle 50 as shown in the front elevational and partially cutaway view of FIG. 5 is now too short to extend outwardly to meet the end of the tines 18 of fork 16, a front axle extender 52 is provided. Front axle extender, like rear axle extender 26, is provided with a base portion 54 having at least two opposing flats to allow extender 52 to be tightened with a common tool. A threaded bore 56 is defined in extender 52 to allow extender 52 to be threaded onto front axle 50. A solid and strong integral body 58 of extender 52 extends from base 54 to a solid and preferably integral fitting 60 which has an exterior envelope similar or identical to bearing 32 used on rear axle extender 26.

Figure 2:
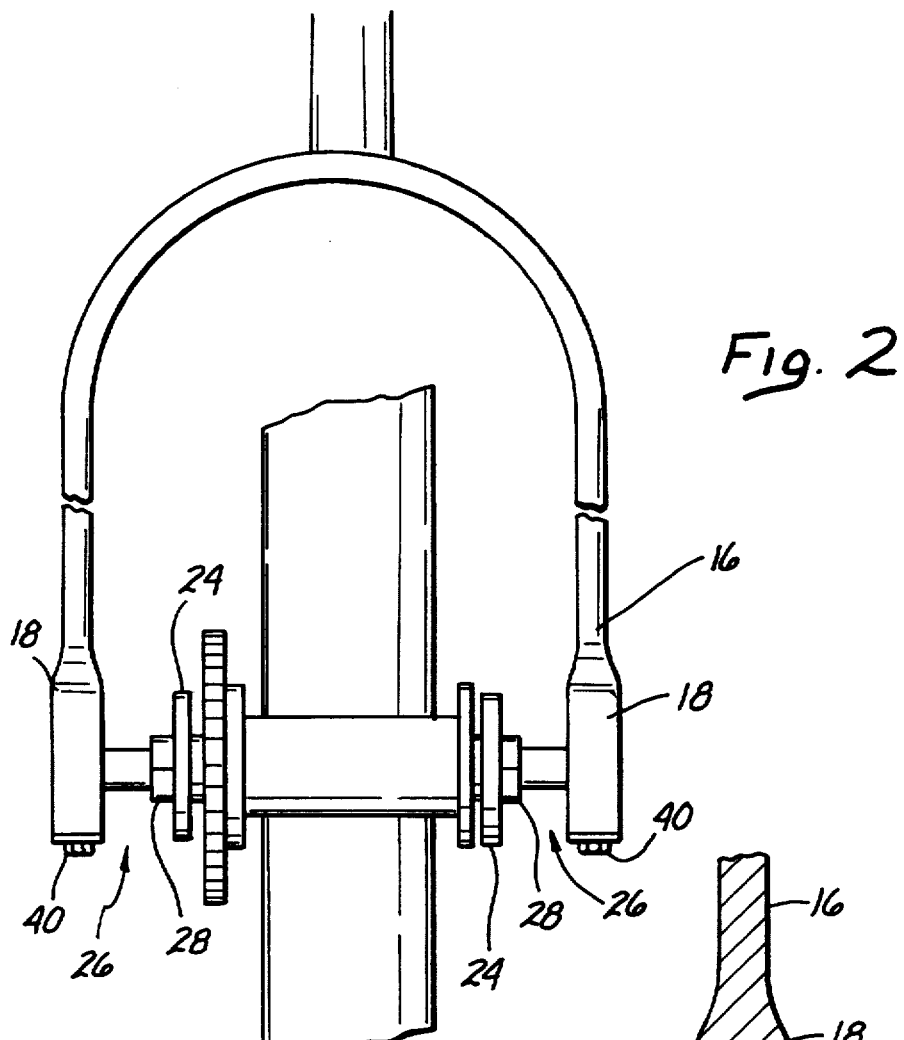
FIG. 2 is a diagrammatic rear plan view of the rear wheel of the front bicycle shown fitted into the modified fork of the rear bicycle of the invention.

The same or similar mechanism as shown in FIG. 3 for coupling tine 18 of fork 16 to bearing 32 is employed for the coupling of tine 18 to fitting 60. The radial extent of bearing 32 as shown in FIG. 3 or fitting 60 as shown in FIG. 5 is sufficient to immobilize fork 16 of rear bicycle 10 so that the handlebars of bicycle 10 cannot be turned. This may be accomplished, for example, by having inner and outer lips or flanges 62 capturing bearing 32 or fitting 60 which is held within a groove 64 defined within termination 36. Only the outer lip 62 of termination 36 is shown in the plan elevational view of FIG. 3 with the inner and opposing lip 66 as disposed on the inside of bearing 32 or fitting 60 as best shown in FIGS. 2, 4, and 6.

Again it must be clearly understood that the means for interconnecting extender 26 or 52 with modified fork 16 may be modified to assume any form which functionally immobilizes fork 16, provides rigid coupling without frame-to-frame connection of bicycle 10 to bicycle 12, but which allows at least a limited degree of rotation of fork 16 in bicycle 10 about rear axle 20 of front bicycle 12.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. An apparatus for converting at least two single rider bicycles into a tandem tricycle, a front one of said two bicycles comprising a front part or said tandem tricycle and a rear other one of said two bicycles comprising a rear part of said tandem tricycle, said rear bicycle having a pre-existing front fork rotatably coupled to said rear bicycle, said pre-existing front fork being rotatable about a single axis, and said front fork having a pair of tines comprising said front fork with a predetermined tine separation, said apparatus comprising:

a replacement front fork for said rear bicycle having an U-shaped expanded tine separation between two structurally integral tines, said tines being separated over a substantial part of their separated length by an expanded distance greater than said predetermined tine separation, said replacement front fork being coupled to said rear bicycle through said single axis as a substitute for said pre-existing front fork; and a rear axle assembly provided for said front bicycle, said rear axle assembly having an axial length at least equal to said expanded distance between said integral tines of said replacement front fork, said rear axle assembly being directly coupled to said pair of integral tines of said replacement front fork of said rear bicycle to provide direct structural coupling therebetween, said front bicycle being provided by said assembly with a rear axle with two ends, said rear axle assembly rotatably coupled to said replacement front fork to provide rigid coupling with said front fork except permitting free rotation of the said front and rear bicycles with respect to each other only about said rear axle, wherein said replacement front fork is a single integral structural unit directly connected to said rear axle assembly.

2. The apparatus of claim 1 wherein said rear axle assembly has a longitudinal axis and comprises:

a rear axle;

at least one body having a bore defined therein for receiving said rear axle;

means for coupling said body to said rear axle; and bearing means for coupling said body to said replacement front fork and to permit rotation of said replacement front fork about said longitudinal axis of said rear axle assembly.

3. The apparatus of claim 1 wherein said rear axle assembly has a longitudinal axis and comprises bearing means or coupling to a terminal portion of said tines of said replacement front fork to substantially permit rotation only around said longitudinal axis of said rear axle assembly.

4. The apparatus of claim 2 wherein said means for coupling to said rear axle comprises a quick release means for clamping said body to said rear axle and wherein said rear axle assembly provides a rear axle extension to permit coupling to said quick release means.

5. The apparatus of claim 1 wherein said front and rear bicycle are adapted to be disassembled from said tandem tricycle, said disassembled rear bicycle being provided with a front wheel with a front axle, said apparatus further comprising a front assembly coupled to said front axle of said rear bicycle, said front assembly for rigidly coupling said front axle of said rear bicycle to said replacement front fork of said rear bicycle and serving to provide an extended front axle of said rear bicycle.

6. The apparatus of claim 5 wherein each front assembly comprises:

a body having a bore defined therein for receiving said front axle of said rear bicycle;

means for coupling said body to said front axle of said front bicycle; and fitting means for coupling said body to said replacement front fork of said rear bicycle.

7. The apparatus of claim 6 wherein said means for coupling said body to said front axle comprises a quick release means for clamping said body to said front axle and wherein said rear axle assembly provides a rear axle extension to permit coupling to said quick release means.

8. The apparatus of claim 3 wherein said terminal portion of said tines of said replacement fork comprises a C-clamp combination for capturing said rear assembly.

9. A conversion kit for converting two single rider bicycles into a tandem tricycle, one of said bicycles being defined as a front bicycle having a rear axle and the other one of said bicycles being defined as a rear bicycle, said rear bicycle having a pre-existing front fork connected to said rear bike by means of a single rotatable coupling, said coupling being rotatable about a single axis, said pre-existing front fork having a pair of tines characterized by a predetermined tine-to-tine separation distance, said conversion kit comprising:

a single piece front fork comprised of a pair of integral tines adapted to fit said rear bicycle, said single piece front fork being adapted to be rotatably coupled to said rear bicycle by replacing said pre-existing front fork and connected to said rear bike by means of said single rotatable coupling of said rear bicycle;

a rear axle assembly for extending said rear axle of said front bicycle and for rotatably coupling to said front fork, said rear axle assembly providing structural coupling directly between said rear axle and said front fork, but permitting rotation of said front and rear bicycles with respect to each other only about said rear axle and said single rotatable coupling, wherein said front fork is characterized by an expanded tine-to-tine separation for direct coupling of each of said integral tines to said rear axle assembly, said expanded tine-to-tine separation being greater than said predetermined tine-to-tine separation distance; and a front axle assembly for extending said front axle of said rear bicycle, said front axle assembly for providing direct structural coupling between said front fork and said front axle of said rear bicycle.

10. The conversion kit of claim 90 wherein each of said integral tines of said front fork comprises a terminal portion having a C-clamp combination, said rear axle assembly and front axle assembly each provide a C-clamp means for coupling to said fork.

* * * * *